United States Patent
Morikura et al.

(10) Patent No.: US 9,942,844 B2
(45) Date of Patent: Apr. 10, 2018

(54) COMMUNICATION CONTROL METHOD AND COMMUNICATION DEVICE FOR ENABLING POWER SAVING

(71) Applicants: KYOTO UNIVERSITY, Kyoto (JP); ALLIED TELESIS HOLDINGS K.K., Tokyo (JP)

(72) Inventors: Masahiro Morikura, Kyoto (JP); Koji Yamamoto, Kyoto (JP); Takayuki Nishio, Kyoto (JP); Tomoyuki Sugihara, Tokyo (JP)

(73) Assignees: Kyoto University, Kyoto (JP); Allied Telesis Hildings K.K., Tokyo (JP)

( * ) Notice: Subject to any disclaimer, the term of this patent is extended or adjusted under 35 U.S.C. 154(b) by 19 days.

(21) Appl. No.: 14/993,022

(22) Filed: Jan. 11, 2016

(65) Prior Publication Data

US 2016/0205624 A1   Jul. 14, 2016

(30) Foreign Application Priority Data

Jan. 14, 2015   (JP) ................ 2015-004907

(51) Int. Cl.
*H04W 52/02* (2009.01)
*H04W 48/12* (2009.01)
*H04W 74/08* (2009.01)
*H04W 84/12* (2009.01)

(52) U.S. Cl.
CPC ........ *H04W 52/0209* (2013.01); *H04W 48/12* (2013.01); *H04W 52/02* (2013.01); *H04W 52/0216* (2013.01); *H04W 52/0219* (2013.01); *H04W 52/0235* (2013.01);

(Continued)

(58) Field of Classification Search
CPC ..... H04W 52/02; H04W 48/12; H04W 74/08; H04W 52/0219; H04W 52/0235; H04W 52/0216; H04L 1/0044; H04L 1/0053
See application file for complete search history.

(56) References Cited

U.S. PATENT DOCUMENTS

2008/0186890 A1* 8/2008 Shao ................ H04W 52/0225
                                                    370/311
2013/0012180 A1* 1/2013 Backholm ......... H04W 52/0258
                                                    455/418

(Continued)

FOREIGN PATENT DOCUMENTS

JP     2012-195971 A     10/2012

*Primary Examiner* — Afshawn M Towfighi
(74) *Attorney, Agent, or Firm* — Hultquist, PLLC; Peter H. Priest; Steven J. Hultquist

(57) ABSTRACT

To save power consumed due to reception of frames destined to other communication devices and enable power saving by prolonging a sleep state.
A communication device is provided including a communication unit which communicates with a base station, a switching unit which switches an operation mode of the communication unit from a normal mode for communicating with the base station to a power saving mode for uncommunicating with the base station, when the communication unit receives data from the base station in a state in which the communication unit does not transmit a data transmission request to the base station, and a determination unit which determines a duration time of the power saving mode, based on a data length of the data received.

5 Claims, 4 Drawing Sheets

(52) U.S. Cl.
CPC ............ *H04W 74/08* (2013.01); *H04W 84/12* (2013.01); *Y02D 70/00* (2018.01); *Y02D 70/142* (2018.01)

(56) References Cited

U.S. PATENT DOCUMENTS

| | | | |
|---|---|---|---|
| 2013/0229963 A1* | 9/2013 | Asterjadhi | H04W 28/044 370/311 |
| 2014/0075228 A1* | 3/2014 | Oyama | G06F 1/329 713/323 |
| 2016/0337968 A1* | 11/2016 | Park | H04W 52/0235 |

* cited by examiner

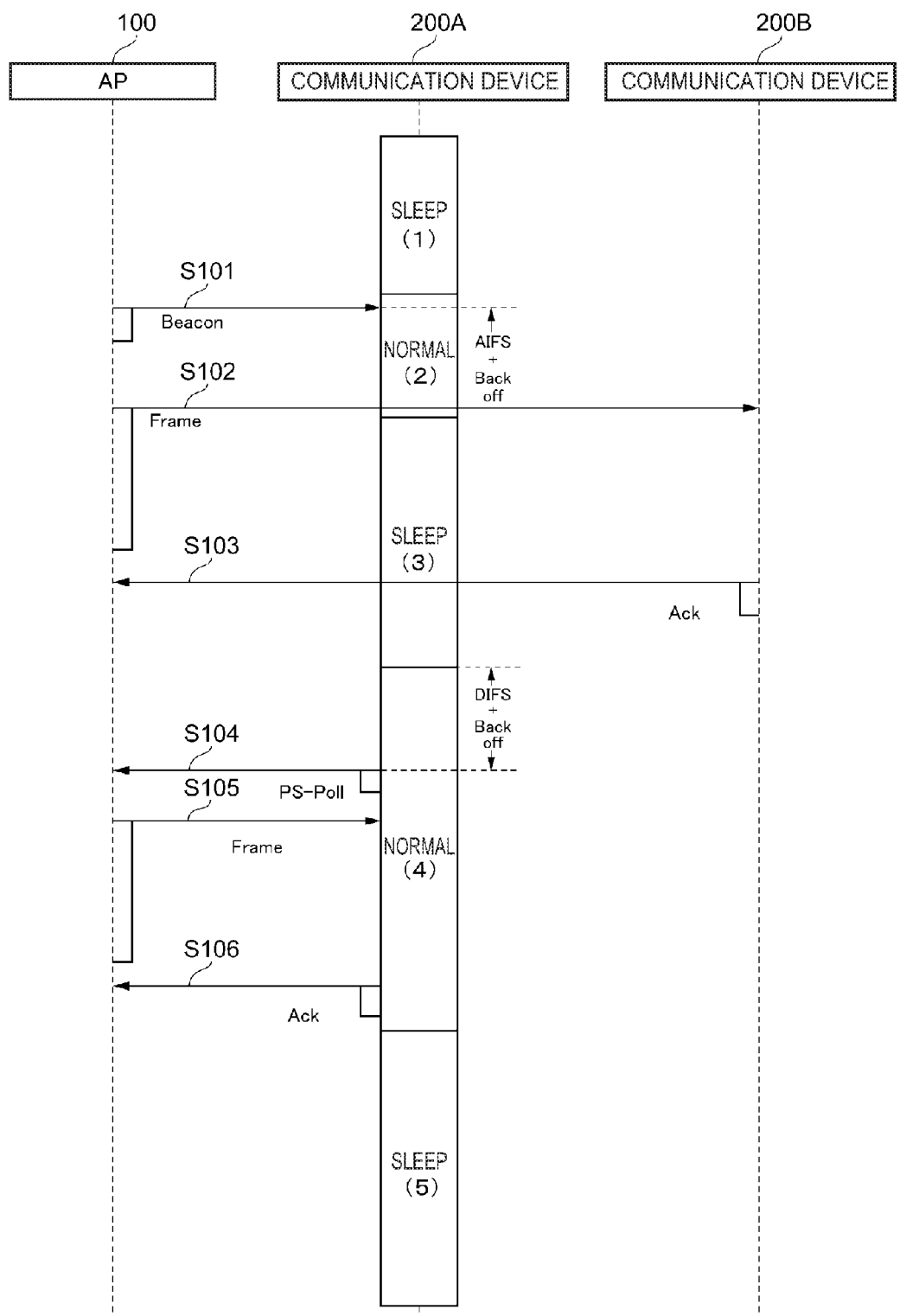

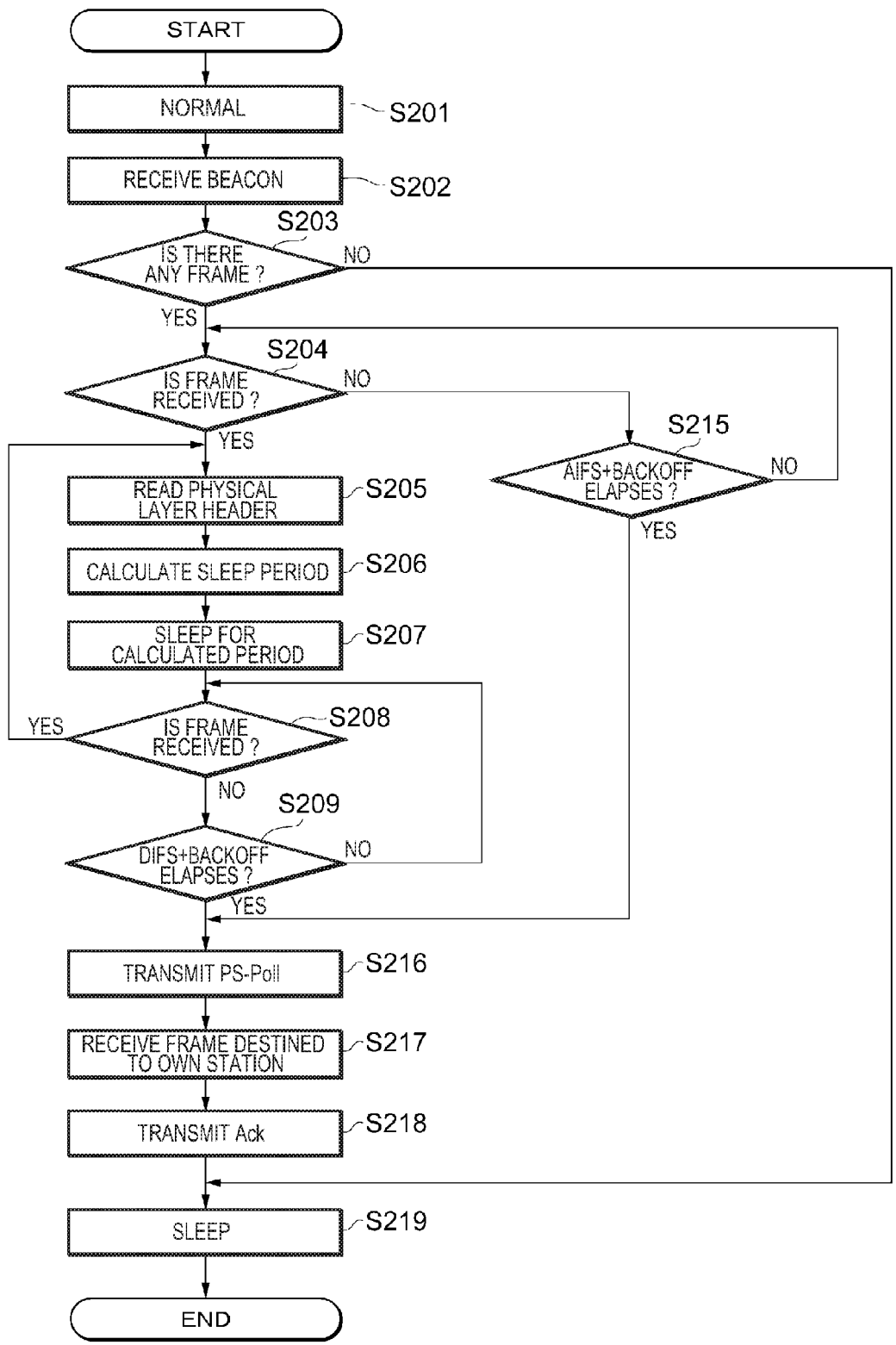

COMMUNICATION CONTROL METHOD AND COMMUNICATION DEVICE FOR ENABLING POWER SAVING

CROSS-REFERENCE TO RELATED APPLICATION

This application claims priority of Japanese Patent Application No. 2015-004907 filed Jan. 14, 2015. The disclosure of Japanese Patent Application no. 2015-004907 is hereby incorporated herein by reference, in its entirety, for all purposes.

BACKGROUND

Field

The present invention relates to a method for controlling data communication by wireless, and a communication device.

Description of Related Art

Products each equipped with a wireless communicating function have been widely in use in recent years. The products include, for example, a portable terminal such as a cellular phone, a portable game device, a notebook PC or the like, various sensors such as a thermometer and a telemeter, etc. Especially, since it is difficult to always supply power to a battery-driven product such as a portable terminal, a sensor or the like, there has been a demand for power saving.

There has been disclosed in Patent Document 1, as a method for achieving power saving of a wireless communication device, a control method which enables the wireless communication device to be brought into a first state for at least a period having a first period length from a transmission timing of a beacon, and after the lapse of the period having the first period length, enables the wireless communication device to be brought into a second state smaller in power consumption than the first state till the next beacon transmission timing.

REFERENCE DOCUMENT LIST

Patent Document

Patent Document 1: Japanese Patent Application Laid-Open No. 2012-195971

SUMMARY

There is, however, lots of room for further power saving in a related art method like the control method disclosed in Patent Document 1.

For example, in a communication procedure based on the IEEE802.11ah standard, a communication device desired to perform transmission of each frame waits for transmission for a prescribed time to avoid the collision of the frames. Then, the communication device performs frame transmission after confirming that no frames flow in a communication network. Even when the communication device detects frames destined to other communication devices irrelevant to its own station, the communication device receives the frames for a period during the transmission standby.

Therefore, in the control method disclosed in Patent Document 1, power is consumed during the transmission standby by receiving the frames of other stations. Further, when the transmission interval of the frames of other stations is large, a waiting time until transmission of an ACK frame by another station becomes long, thus resulting in the shortening of a sleep state and making it more difficult to achieve power saving.

The present invention has been made in terms of the foregoing. The present invention is intended to provide a communication device which save power consumed due to the reception of frames destined to other communication devices, and prolongs a sleep state, thereby enabling power saving.

A communication device according to a prescribed embodiment of the present invention is including a communication device comprising a communication unit which communicates with a base station, a switching unit which switches an operation mode of the communication unit from a normal mode for communicating with the base station to a power saving mode for uncommunicating with the base station, when the communication unit receives data from the base station in a state in which the communication unit does not transmit a data transmission request to the base station, and a determination unit which determines a duration time of the power saving mode, based on a data length of the data received.

Incidentally, in the present specification, etc., the term "unit" does not mean simply a physical configuration, but also includes a case where a function that the physical configuration has is realized by software. Further, even if a function that one configuration has is realized by two or more physical configurations, the function of two or more configurations may be realized by one physical configuration.

According to the present invention, it is possible to save power consumed due to the reception of frames destined to other communication devices and prolong a sleep state.

BRIEF DESCRIPTION OF DRAWINGS

FIG. 3 is a sequence diagram illustrating communication processing of the wireless communication system according to the one embodiment of the present invention; and FIG. 4 is a flowchart illustrating communication processing of the communication device 200 according to the one embodiment of the present invention.

DETAILED DESCRIPTION

Figure 1:
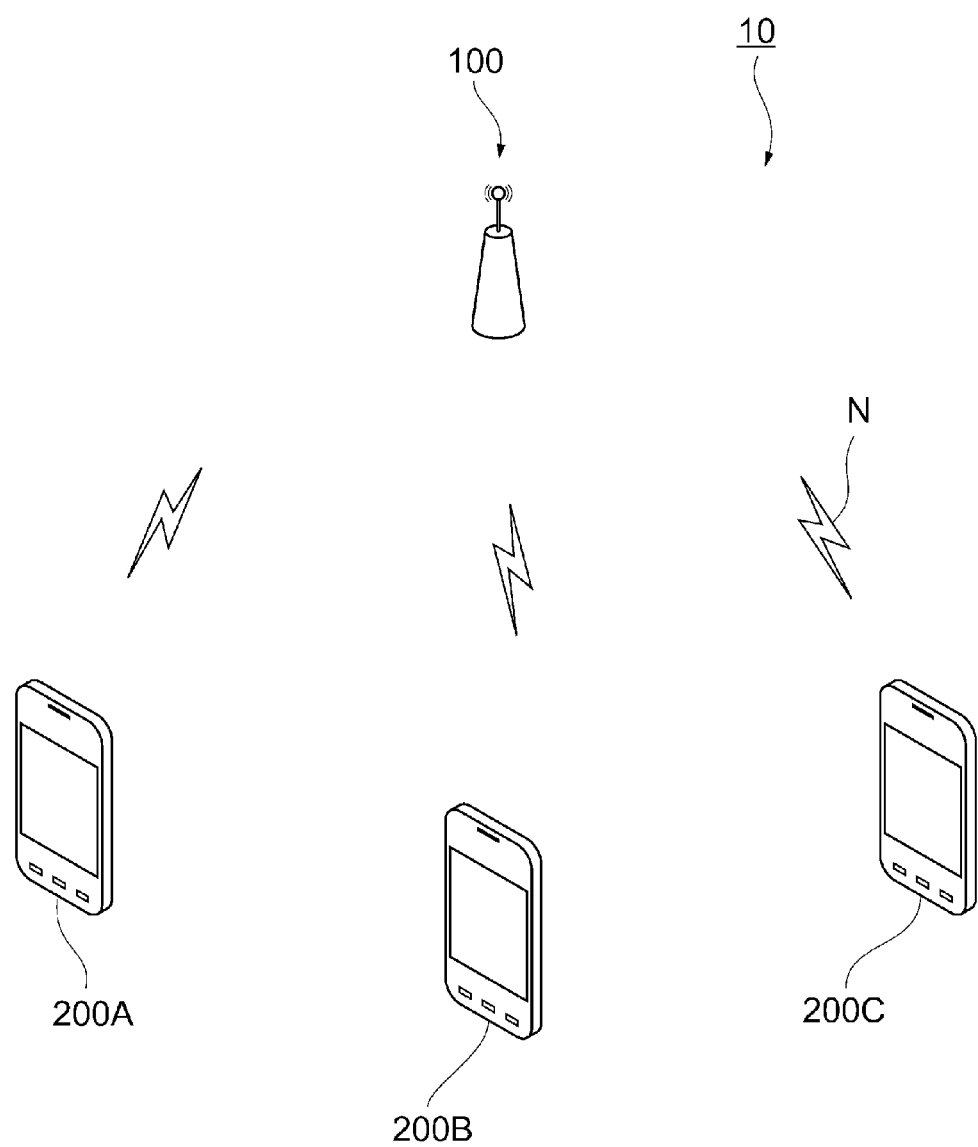
FIG. 1 is a system configuration diagram of a wireless communication system according to one embodiment of the present invention.

A preferred embodiment of the present invention will hereinafter be described in detail with reference to the accompanying drawings. Incidentally, the same reference numerals are respectively attached to the same elements, and their dual description will be omitted. Also, the following embodiment is an illustration for describing the present invention and is not intended to limit the present invention only thereto. Further, the present invention can be modified in various ways unless departed from the gist thereof.

FIG. 1 is a diagram illustrating a system configuration of a wireless communication system 10 according to one embodiment of the present invention. The wireless communication system 10 is configured by connecting an access point 100 and communication devices 200A, 200B, and 200C (hereinafter the communication devices 200A, 200B, and 200C are also collectively called a communication device 200) to each other via a network N.

The network N is a communication network for transmitting data between the access point 100 and the communication device 200. In the present embodiment, a communication line utilizing a wireless communication network as a physical layer will be described by way of example. Incidentally, the network N is not limited to the wireless communication network and may be a frame communication network typified by a LAN (Local Area Network) and an Internet network (or a combination thereof). The physical layer may be any of Ethernet (registered trademark), a public telephone communication network, a general telephone line network, other communication lines, a combination of these, etc. Further, the network N can also include a gateway, various base stations, an exchange, etc. for connecting between respective communication networks.

In the present embodiment, it is desirable that the access point 100 constructs a network that conforms to the IEEE802.11 standard. Although not illustrated in FIG. 1, the wireless communication system 10 may also include a plurality of access points.

The communication device 200 refers to a device which communicates with other communication terminals via the access point 100. It is desirable that the communication device 200 is equipped with a wireless communication function based on the IEEE802.11ah standard. For example, the communication device 200 may include a portable terminal such as a cellular phone, a game terminal, a notebook PC or the like, various sensors such as a thermometer, a telemeter, etc., etc.

Figure 2:
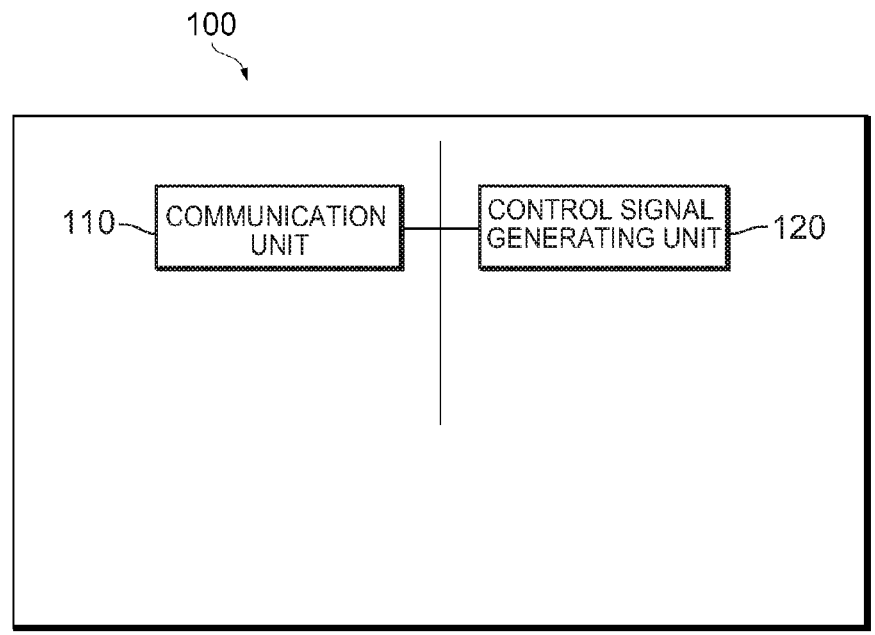
FIG. 2 is a block diagram illustrating functional configurations of an access point 100 and a communication device 200 according to the one embodiment of the present invention.
Figure 2:
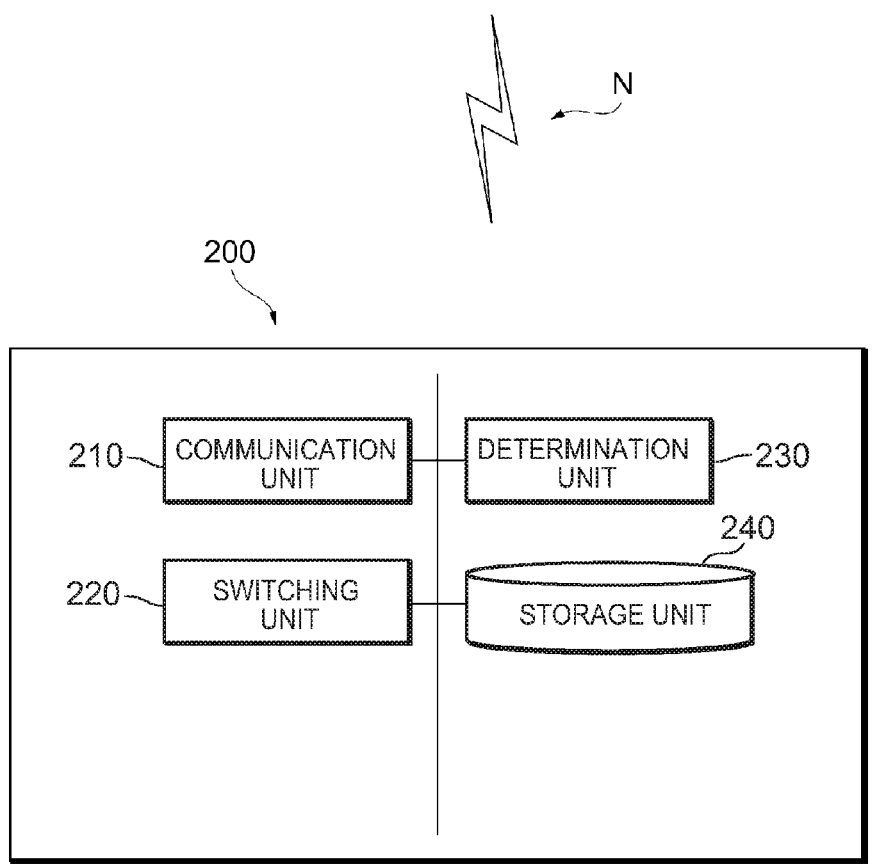

FIG. 2 is a block diagram illustrating functional configurations of the access point 100 and the communication device 200 according to the one embodiment of the present invention.

The access point 100 has at least a communication unit 110 and a control signal generating unit 120 as functional units.

The communication unit 110 wireless-communicates with the communication device 200 via the network N. The communication unit 110 is capable of storing data received from the communication device 200 in a buffer provided there inside and transmitting the data in the buffer to the communication device taken to be a destination in the communication device 200. Further, the communication unit 110 transmits a beacon signal (control signal) generated for every constant period from the control signal generating unit 120 to be described later to the communication device 200.

It is desirable that the beacon signal includes TIM (Traffic Indication Map) information. The TIM information is information for notifying the arrival of the data destined to the corresponding communication device to the communication device 200. It is desirable that the TIM information includes a notice indicating the data destined to the communication device 200 being held in the buffer, and ID information indicative of the communication device being the destination of the data. The communication device 200 can determine by confirmation of the TIM information included in the beacon signal whether or not it is necessary to transmit a frame transmission request (PS-Poll) to the access point 100.

Next, the functional configuration of the communication device 200 will be described by taking for example the communication device 200A. Incidentally, it is desirable that the communication devices 200B and 200C are also similar in functional configuration to the communication device 200A. The communication device 200A is equipped with at least a communication unit 210, a switching unit 220, a determination unit 230, and a storage unit 240 as functional units.

The communication unit 210 performs communication with the access point 100. Specifically, the communication unit 210 divides data into frames, transmits the same to the access point 100, and transmits a transmission request (PS-Poll) for receiving data held by the access point 100, etc. to the access point 100. It is desirable that the communication unit 210 performs communication by using the existing communication procedure called CSMA/CA (Carrier Sense Multiple Access with Collision Avoidance) so as to avoid the collision of the transmitted frames. Specifically, when the communication device 200A performs the transmission of PS-Poll or the frames such as data, the communication unit 210 first confirms that the frames do not flow on the communication network during a period called DIFS (DCF Interframe Space). Thereafter, the communication unit 210 further performs the transmission of the frames after it waits until a backoff period elapses. Incidentally, the waiting period can also be taken as not the DIFS period but a period called AIFS (Arbitration Interframe Space). When the AIFS period is used for the waiting period, the number of collisions of the frames can be reduced even when the number of the communication devices is large, thereby making it possible to achieve power saving.

Also, the communication unit 210 has two types of operation modes which are a normal mode and a power saving mode. The normal mode is a mode for communicating with the access point 100. The power saving mode is a mode for avoiding communication with the access point 100. A state of the communication unit 210 from the transition of the communication unit 210 to the power saving mode to the transition thereof to the normal mode is referred to as a "sleep state". Further, a state of the communication unit 210 from the transition of the communication unit 210 to the normal mode to the transition thereof to the power saving mode is referred to as a "normal state". The power consumption of the communication unit 210 is smaller in the sleep state than in the normal state. Therefore, the power consumption of the communication device 200 can be reduced as the time when the communication unit 210 is in the sleep state becomes longer.

Further, when the communication unit 210 receives a frame from the access point 100 in a state in which PS-Poll is not transmitted to the access point 100, the communication unit 210 reads a physical layer header of the frame and thereby interrupts the reception of the frame.

It is desirable that "a state (hereinafter called also as a "transmitted state") in which the communication unit 210 is transmitting PS-Poll to the access point 100" refers to a period during which a time point when the communication unit 210 transmits PS-Poll to the access point 100 is defined as a starting point, and a time point when the reception of data related to the PS-Poll is completed is defined as an end point. Incidentally, the end point of the transmitted state may be available for when the transmission of an ACK frame indicative of the completion of reception of the data related to the PS-Poll transmitted by the communication unit 210 is completed.

On the other hand, it is desirable that "a state (hereinafter called also as an "untransmitted state") in which the communication unit 210 does not transmit PS-Poll to the access point 100" refers to a state other than the transmitted state. That is, it is desirable that the untransmitted state refers to a period during which a time point when the reception of data related to PS-Poll transmitted by the communication unit 210 at a certain time is completed is defined as a starting point and then a time point when PS-Poll is transmitted to the access point 100 is defined as an end point. Incidentally, when the end point of the transmitted state is defined as when the transmission of the ACK frame indicative of the completion of reception of the data related to PS-Poll is completed, the starting point of the untransmitted state may be available for when the transmission of the ACK frame indicative of the completion of reception of the data related to PS-Poll is completed.

When the communication unit 210 of the communication device 200A is in the untransmitted state, the frame destined to the communication device 200A (frame destined to the communication device 200A, which is transmitted to the communication device 200A is called also as a "frame destined to its own station") is not transmitted from the access point 100. Therefore, in this case, the communication unit 210 can regard a received frame as a frame of data destined to other communication devices 200B and 200C (other communication device 200B or 200C relative to the communication device 200A will hereinafter be called also as "other station") even without receiving up to an Ethernet frame and confirming its destination. Thus, when the communication unit 210 receives a frame in the untransmitted state of PS-Poll, the communication unit 210 reads up to its physical layer header and discards the frame, thereby enabling transition to the power saving mode. It is thus possible to reduce power consumption of the reception processing.

The switching unit 220 performs control for switching of the operation mode of the communication unit 210. Specifically, when the switching unit 220 receives the frame from the access point 100 in a state in which the communication unit 210 does not transmit a request for transmission of data to the access point 100, the switching unit 220 switches the operation mode of the communication unit 210 from the normal mode for performing communication with the access point 100 to the power saving mode for avoiding communication with the access point 100.

As described above, when the communication unit 210 is in the state in which the communication unit 210 does not transmit PS-Poll to the access point 100, the frame destined to the own station is not transmitted from the access point 100. Therefore, in this case, the frame received by the communication unit 210 can be considered to be a frame of data destined to the other station. For the reason, the communication unit 210 must wait for the transmission of each frame to prevent the collision of the frames with each other while the transfer of data between the access point 100 and other stations is being performed. During this waiting period, the switching unit 220 switches the operation mode of the communication unit 210 to the power saving mode. Thus, it is possible to suppress power consumption when other stations or the access point 100 utilizes the network N, that is, while the communication unit 210 must wait for frame transmission.

Further, it is desirable that the switching unit 220 switches the operation mode of the communication unit 210 from the power saving mode to the normal mode, based on a cycle during which the access point 100 transmits the beacon signal to the communication device 200. For example, the switching unit 220 may switch the communication unit 210 to the normal mode at every time when timing provided to transmit the beacon signal by the access point 100 comes. Further, the switching unit 220 may switch the communication unit 210 to the normal mode in a cycle at once every a plurality of times at which this timing comes.

The determination unit 230 determines the duration time of the power saving mode, based on the size (hereinafter the size of a received frame destined to other station is called also as a "frame size L" or a "frame length L") of the received frame destined to other station. The frame size is described in a length field of the physical layer header. The determination unit 230 can capture the frame size L by referring to the frame read up to the physical layer header by the communication unit 210.

It is desirable that the determination unit 230 determines, from the frame size L, a period when other station or the access point 100 is considered to be using the network N, to be the duration time of the power saving mode. Specifically, it is desirable that the determination unit 230 determines, as the duration time, a period obtained by subtracting the DIFS period from a period obtained by adding the frame size L, SIFS (Short Interframe Space) period, ACK frame length, and AIFS period together.

Other communication device 200B or 200C having received the frame from the access point 100 transmits an ACK frame after the SIFS period elapses since the reception of the frame. Therefore, the communication device 200A cannot be used because the network N is used during a period obtained by adding at least the frame size L, SIFS period, and ACK frame length. This is because there is a fear that when the communication device 200A transmits the frames during this period, they will collide with each other.

According to the conventional communication procedure, when it is determined that the frame destined to the own station exists, it is not possible to perform switching to the power saving mode until PS-Poll is transmitted, the frame to the own station is received, and the transmission of the ACK frame is completed. In the communication device 200A according to the present embodiment, when the frame received by the communication unit 210 is considered to be the frame of data destined to other stations, i.e., when the communication unit 210 is in the untransmitted state, the determination unit 230 can regard a period based on the frame size L as a period in which the network N is being used. Thus, since the communication unit 210 needs not to monitor the network N, the communication unit 210 can be switched to the power saving mode, so that power consumption can be suppressed.

A description will be made about processing for control of the operation mode of the communication device 200A configured in this manner, by using FIG. 3.

FIG. 3 is a sequence diagram of the wireless communication system 10.

The communication unit 210 of the communication device 200A is set to the power saving mode until the transmission cycle of the beacon signal comes ((1) sleep state). The switching unit 220 switches the operation mode of the communication unit 210 from the power saving mode to the normal mode with a timing (S101) at which the access point 100 transmits the beacon signal ((2) normal state). In this example, it is assumed to be described in TIM information of the beacon signal that the frame destined to the communication device 200A is held in the access point 100.

The communication device 200A needs to transmit PS-Poll in order to receive the data held in the access point 100. At this time, the communication unit 210 waits for transmission for the AIFS period and the backoff period to avoid the collision of the frames.

In the example of FIG. 3, the access point 100 transmits a frame to the communication device 200B while the communication device 200A is waiting for transmission (S102). When the communication unit 210 of the communication device 200A receives the frame destined to the communication device 200B, the communication unit 210 reads up to the physical layer header of the frame and discards the frame because the communication unit 210 has not yet transmitted PS-Poll. Then, the communication unit 210 is switched to the power saving mode for the duration time determined by the determination unit 230 ((3) sleep state).

When a prescribed duration time elapses, the switching unit 220 switches the operation mode of the communication unit 210 to the normal mode again ((4) normal state). Since the AIFS period has elapsed during the sleep state, the communication unit 210 confirms here that no frame flows on the network N for the DIFS period and the backoff period, and thereafter transmits PS-Poll to the access point 100 (S104). The access point 100 having received PS-Poll therein transmits the data held therein to the communication device 200A in frame units (S105). When the communication unit 210 receives the frame therein, the communication unit 210 transmits the ACK frame after the lapse of the SIFS period (S106).

When there is no other data available to be transmitted, the switching unit 220 switches the communication unit 210 to the power saving mode till the time when the next beacon signal is transmitted ((5) sleep state).

A control flow of the communication unit 210 of the communication device 200 configured in this manner will next be described using FIG. 4.

FIG. 4 is a flowchart illustrating control processing of the communication device 200.

During the transmission cycle of the beacon signal from the access point 100, the switching unit 220 switches the operation mode of the communication unit 210 to the normal mode (S201). When switched to the normal mode, the communication unit 210 receives the beacon signal (S202) and confirms whether or not the data destined to its own station is held in the access point 100 (S203). When the data destined to the own station is not held in the access point 100 (S203: NO) and the communication device 200 does not hold data to be transmitted, the switching unit 220 switches the operation mode of the communication unit 210 to the power saving mode (S219).

When it is described in TIM information of the beacon signal that the access point 100 holds the data destined to the own station (S203: YES), the communication unit 210 waits to transmit PS-Poll. When the communication unit 210 receives a frame therein for that interval (S204: YES), the communication unit 210 reads a physical layer header of the frame to discard the frame (S205). The determination unit 230 determines the duration time of the power saving mode, based on the frame length described in the length field of the physical layer header read by the communication unit 210 (S206). The switching unit 220 switches the operation mode of the communication unit 210 to the power saving mode for the determined duration time and switches the operation mode thereof to the normal mode again after the lapse of the duration time (S207). When the communication unit 210 receives a frame therein again before the lapse of the DIFS period and the backoff period (S208: NO), the communication device 200 performs the processing from S205 to S209 again.

On the other hand, when the communication unit 210 does not receive the frame until the DIFS period and the backoff period elapse (S208: NO, S209: YES), the communication unit 210 transmits PS-Poll to the access point 100 (S216).

Further, when the reception of the frame transmitted from the access point 100 is completed (S217), the communication unit 210 transmits an ACK frame after the SIFS period elapses since the completion of its reception (S218). When the frames of data held by the access point 100 are all received, and the transmission of the ACK frame by the communication unit 210 is completed, the switching unit 220 switches the operation mode of the communication unit 210 to the power saving mode (S219).

On the other hand, in Step S204, when the AIFS period and the backoff period elapse without reception of the frame by the communication unit 210 (S204: NO, S215: YES), the communication unit 210 transmits PS-Poll to the access point 100 (S216). Then, when the reception of the frames transmitted from the access point 100 is completed (S217), the communication unit 210 transmits an ACK frame after the SIFS period elapses since the completion of the frame reception (S218). When the communication unit 210 receives therein all of the frames of the data held by the access point 100, and the transmission of the ACK frame is completed, the switching unit 220 switches the operation mode of the communication unit 210 to the power saving mode (S219).

The communication device 200 repeatedly performs the processing from S201 to S219 in the cycle in which the access point 100 transmits the beacon signal.

The communication device 200 according to the present embodiment that has been configured in this manner is capable of saving power consumed due to the reception of the frames destined to other communication devices and prolonging the sleep state. It is thus possible to reduce power consumption.

Incidentally, the present invention is not limited to the above-described embodiment, but can be carried out in other various forms within the scope not departing from the gist of the present invention. Therefore, the above embodiment is a mere illustration in all respects and is not to be construed as limited thereto. For example, the above-described respective processing steps can be arbitrarily changed in turn in a range in which no contradiction occurs in processing contents or can be carried out in parallel.

REFERENCE SIGNS LIST 10 wireless communication system
100 access point
110 communication unit
120 control signal generating unit
200 communication device
210 communication unit
220 switching unit
230 determination unit
N network

What is claimed is:
1. A communication device comprising:
a communication unit which communicates with a base station;
a switching unit which switches an operation mode of the communication unit from a normal mode for communicating with the base station to a power saving mode for uncommunicating with the base station, when the communication unit receives data destined for another station from the base station in a state in which the communication unit does not transmit a data transmission request to the base station; and
a determination unit which determines a duration time of the power saving mode, based on a data length of the data received.

2. The communication device according to claim 1, wherein the switching unit switches the operation mode from the power saving mode to the normal mode, based on a cycle in which the base station transmits a control signal to the communication unit.

3. The communication device according to claim 1, wherein when the communication unit receives data from the base station in the state in which the communication unit does not transmit the data transmission request to the base station, the communication unit reads a physical layer header of the data and interrupts the reception of the data.

4. The communication device according to claim 2, wherein when the communication unit receives data from the base station in the state in which the communication unit does not transmit a data transmission request to the base station, the communication unit reads a physical layer header of the data and interrupts the reception of the data.

5. A method for controlling a communication device having a communication unit which communicates with a base station, comprising the steps of:
- switching an operation mode of the communication unit from a normal mode for communicating with the base station to a power saving mode for uncommunicating with the base station when the communication unit receives data destined for another station from the base station in a state in which the communication unit does not transmit a data transmission request to the base station, and
- determining a duration time of the power saving mode, based on a data length of the data received.

* * * * *

UNITED STATES PATENT AND TRADEMARK OFFICE
CERTIFICATE OF CORRECTION

PATENT NO.         : 9,942,844 B2
APPLICATION NO.    : 14/993022
DATED              : April 10, 2018
INVENTOR(S)        : Masahiro Morikura Page 1 of 1

It is certified that error appears in the above-identified patent and that said Letters Patent is hereby corrected as shown below:

On the Title Page

Under Assignees (73): "Allied Telesis Hildings K.K." should be -- Allied Telesis Holdings K.K.--.

Signed and Sealed this
Twenty-second Day of May, 2018

Andrei Iancu
*Director of the United States Patent and Trademark Office*